Aug. 7, 1962 A. J. PANKRATZ ET AL 3,048,315

ENDLESS TAPE SYSTEM

Filed Oct. 22, 1959 2 Sheets-Sheet 1

INVENTORS:
A. J. Pankratz
Robert M. Shoemaker
Eugene S. Steen

By [signature]
Attorney.

ENDLESS TAPE SYSTEM

Filed Oct. 22, 1959 2 Sheets-Sheet 2

INVENTORS:
A.J. Pankratz
Robert M. Shoemaker
Eugene S. Steen

By [signature]
Attorney

United States Patent Office 3,048,315
Patented Aug. 7, 1962

3,048,315

ENDLESS TAPE SYSTEM

A. J. Pankratz, La Canada, Robert M. Shoemaker, Whittier, and Eugene S. Steen, Lakeview Terrace, Calif., assignors to General Precision, Inc., a corporation of Delaware Filed Oct. 22, 1959, Ser. No. 848,016
3 Claims. (Cl. 226—118)

This invention relates to an improved endless record tape system and more particularly to an improved endless record tape system wherein the tape travels continuously past one or more transducing stations with the major portion of the endless tape stored in serpentine folds in a suitable magazine.

Briefly described the preferred embodiment of the invention comprises a multiple track magnetic tape memory system for use in computers or the like wherein the magnetic record tape is run continuously past transducing means to receive information for memory storage and to make the stored information repeatedly available. The tape may comprise for example, a photographic film, a punched tape or a magnetic recording tape. Such a system requires that the tape travel at relatively high speed with the whole length of the tape passing the transducing means every few seconds.

One object of the invention is to increase the memory capacity of such a system by making it possible to store an exceptionally large amount of traveling tape in a given available storage area.

This object is attained by a novel pattern of serpentine folds in the configuration of the temporarily stored portion of the endless tape. This new pattern increases the storage capacity in comparison with prior art practices by reducing the number of folds or 180° bends of the tape per hundred linear feet of the tape and by stacking numerous runs of the tape between the 180° bends in compact face to face relationship.

Another object of the invention is to provide a method of forming the stored portion of the continuously traveling tape in the desired serpentine pattern.

As will be explained, this latter object is attained in part by what may be described as controlled buckling of the tape. The tape entering the storage space is caused to buckle periodically to form successive 180° bends or loops, and the successively formed loops aggressively nose along a predetermined path in guiding contact with a curved boundary wall of the storage area, encountering and pushing aside the previously stored tape. The resistance to the advance of each successive loop progressively rises to a critical value, whereupon the advance is arrested and the ingoing tape buckles near the entrance to the storage space to start a new advancing loop. A feature of the invention is the provision of an obstacle at a predetermined point along the path of the successively advancing loops, which obstacle abruptly increases the resistance to the advance of a tape loop to terminate the advance and to cause a new loop to be formed by buckling action.

This object of causing the stored tape to form the desired serpentine pattern is achieved in further part by inclining the storage surface towards the curved boundary wall of the storage space along which the successively formed tape loops advance. By virtue of such inclination, the stored runs or lengths of the tape that are formed by the successive advancing loops tend to gravitate laterally towards the curved boundary wall to stack together compactly in face to face relationship.

This object of causing the stored tape to form the desired serpentine pattern may be further facilitated by causing the inclined storage surface to vibrate. The vibration promotes the gravitation of the stored runs of tape.

A further object of the invention is to minimize any wear on the coated side of the tape that may be caused by the movement of the tape into, through, and out of the storage space. One feature of the invention in this regard is the concept of forming the successively advancing loops with the coated side of the tape turned inwardly of the loops. Thus, it is the outer uncoated side of an advancing tape that makes sliding contact with the boundary wall and pushes aside the previously stored tape. It is also to be noted that it is the uncoated side of the stored tape that is contacted by each successive advancing tape loop. A further feature is the withdrawal of the tape from the stored pattern by an unfolding action with no appreciable rubbing between confronting coated surfaces.

The various features and advantages of the invention may be understood from the following detailed description taken with the accompanying drawings.

In the drawings, which are to be regarded as merely illustrative:

Figure 1:
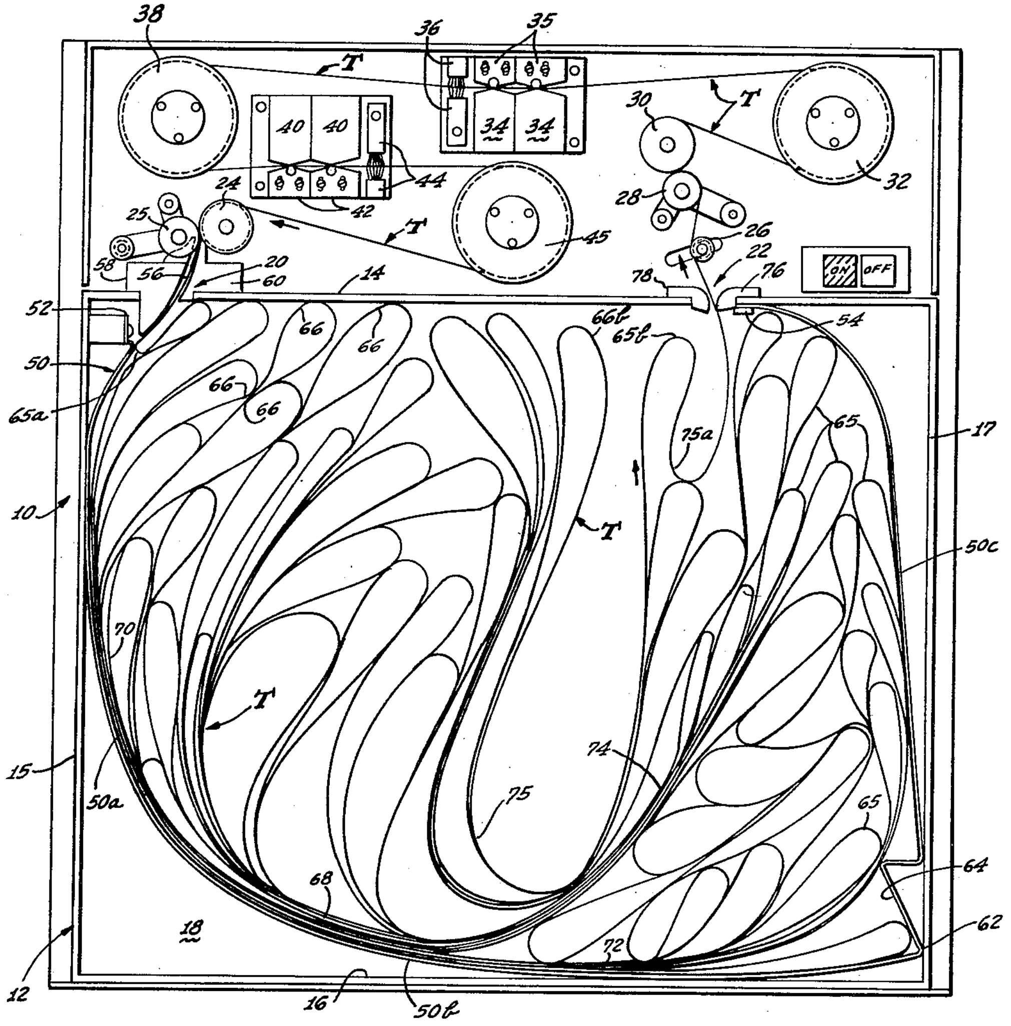
FIG. 1 is a plan view of an endless tape record system illustrating the presently preferred practice of the invention, the cover to the tape magazine being removed.

FIG. 1 shows a base plate 10 on which is mounted a replaceable tape magazine or cartridge, generally designated 12, and an adjacent array of tape controlling components. The tape magazine 12 may be in the form of a shallow box with four side walls 14, 15, 16 and 17, and a bottom plate 18. The bottom plate is preferably smooth surfaced and may be made of polished stainless steel. The film magazine has a removable cover (not shown) and is mounted on the base plate 10 in a quickly detachable manner. The magnetic record tape, generally designated T, is stored in the magazine 12 in serpentine folds. In this particular practice of the invention, a row of sprocket holes (not shown) extends along at least one of the longitudinal margins of the tape in a well-known manner.

The side wall 14 of the magazine 12 adjacent the array of components has an entrance opening designated by the arrow 20 and the interior of the magazine in the region of the entrance opening may be aptly referred to as the entrance region. The side wall 14 also has an exit opening designated by the arrow 22 and the adjacent region of the interior of the magazine may be termed the exit zone. This arrangement provides an outside loop of tape between the exit opening 22 and the entrance opening 20, which loop is acted upon by the array of components. The tape is quickly releasable from the array of components to permit one tape-containing magazine to be quickly substituted for another.

Any suitable array of tape controlling components may be used in practicing the invention, it being essential that the array be designed to drive the tape longitudinally into the entrance opening 20. In the particular arrangement shown in FIG. 1, the tape is driven directly into the entrance opening 20 by a power actuated drive sprocket 24, the tape being held against the drive sprocket by a spring-pressed idler roller 25. The tape issuing from the exit opening 22 of the magazine is flexed by a yielding guide member 26 in a well-known manner and is pressed by an idler roller 28 against a drag sprocket 30. The drag sprocket holds back on the tape and thus cooperates with the drive sprocket 24 to place the intervening length of the tape under suitable tension.

From the drag sprocket 30, the traveling tape passes around a first reversing roller 32 and then passes between a pair of transducers 34 and a corresponding pair of backing blocks 35. The tape is swept by a pair of brushes 36 and passes around a second reversing roller 38. From the second reversing roller 38, the tape passes between a pair of transducers 40 and corresponding backing blocks 42 and passes between a second pair of brushes 44. The tape then passes around a third reversing roller 45 before reaching the drive sprocket 24.

The storage area on the smooth bottom plate 18 of the tape magazine 12 is bounded by the previously mentioned side wall 14 of the magazine and is further bounded by a boundary wall in the form of a polished metal band generally designated 50. Considering the magazine wall 14 as bounding the first side of the storage area, a portion **50*a* of the metal band 50 bounds a second side of the storage area adjacent the first side and a second portion 50*b* of the metal band bounds a third side of the storage area opposite from the first side. A third portion 50*c* of the metal band 50 bounds the fourth side of the storage area. Thus the three bounding portions 50*a*, 50*b* and 50*c* of the metal band correspond, respectively, to the three side walls 15, 16 and 17 of the tape magazine. One end of the metal band 50 is hooked behind a retaining clip 52 near the entrance opening 20 and the second end of the metal band is engaged by a second retaining clip 54 in the region of the exit opening. The two portions 50*a* and 50*b* of the boundary wall formed by the band 50 are longitudinally curved inwardly of the storage space, the portion 50*a* making a smooth curved transition to the portion 50*b***.

Figures 2, 4:
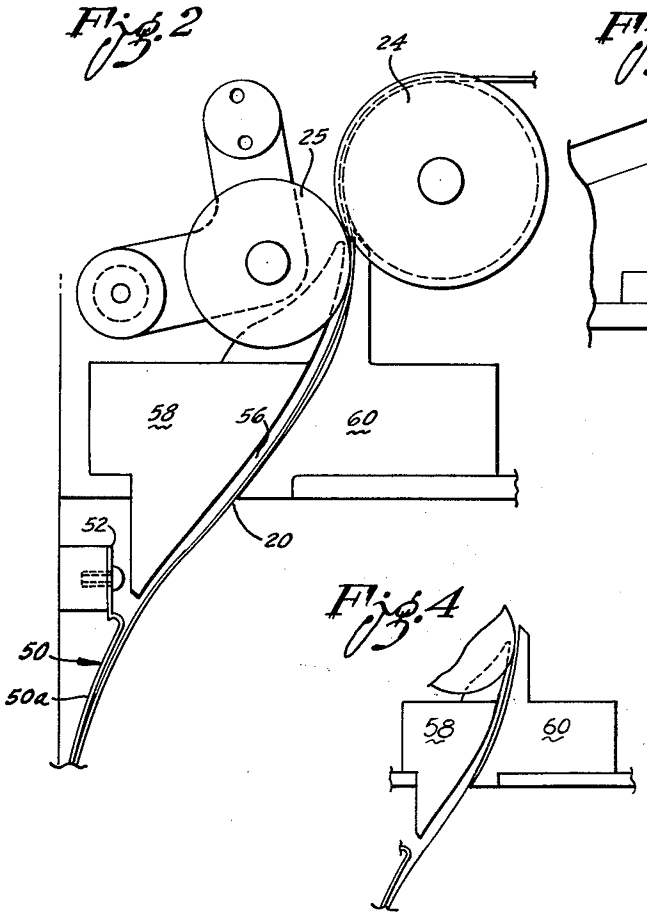
FIG. 2 is an enlarged fragment of FIG. 1 showing how a drive sprocket together with a cooperating idler roller directs the traveling tape through the entrance to the tape magazine.
FIG. 4 is a fragmentary view similar to FIG. 1 illustrating the initial step in the periodic buckling of the tape.

As best shown in FIG. 2, the tape issuing from the drive sprocket 24 enters a guide passage 56 that is formed by two spaced guide blocks 58 and 60. The guide passage 56 directs the tape against the portion **50*a* of the metal band 50 at an extremely low angle to cause the traveling tape to make face to face contact with the metal band. It is essential to keep the tape from buckling as it slides along the curved portions 50*a* and 50*b* of the metal band, but a second wall cannot be provided for this purpose because the successively formed runs of the tape must be free to move laterally away from the metal band towards the central region of the storage space. A feature of the invention in this regard is that the gradual curvature of the portions 50*a* and 50*b* of the metal band causes the edgewise propelled tape to tend to push against the wall in reaction to the edgewise propelling force and thus militates against any tendency of the tape to buckle away from the wall. Thus there is high resistance to buckling along the curved portions 50*a* and 50*b*** of the metal band, the least resistance to buckling of the newly entering tape being in the region of the entrance zone. Consequently, when the resistance to travel of the edgewise-propelled tape rises above some critical value, the tape buckles in the entrance zone and nowhere else, the buckling forming a new loop of tape to advance along the curved metal band.

For the purpose of insuring that the least resistance to buckling will be located in the entrance zone of the tape magazine, the guide passage 56 leading to the entrance opening 20 may be curved oppositely from the curvature of the boundary wall 50. Thus, as may be seen in FIG. 1, the portions **50*a* and 50*b* of the metal band 50 are curved about centers of curvature that are located rightward from the metal band whereas the guide passage 56 has its center of curvature located in the opposite direction. Since the two curvatures are opposite, the newly entering traveling tape is given a slight reverse curvature and this slight reverse curvature constitutes in effect an incipient buckle that may be triggered by rise to a critical value of the resistance to edgewise travel of the tape along the metal band. As shown in FIG. 2, the traveling tape is slightly diverted or flexed to the left by contact with the right hand wall of the guide passage 56**.

Suitable means may be provided to cause the resistance to the edgewise travel of the tape along the metal band 50 to rise abruptly when each successive advancing loop of tape reaches a predetermined point. In the present embodiment of the invention, the metal band 50 itself forms an obstacle in the path of the advancing tape. For this purpose, the metal band 50 makes a sharp bend 62 at the juncture of the two wall portions **50*b* and 50*c*, and thus forms an obstacle 64 directly across the path of advance of the successive tape loops. At times, the rising resistance to the advance of a loop of tape may cause the tape to buckle before the advancing loop reaches the obstacle 64. Normally, however, each advancing loop of tape makes headlong impact against the obstruction 64** as shown in FIG. 1, which in turn triggers the buckling action at the entrance zone.

Figure 5:
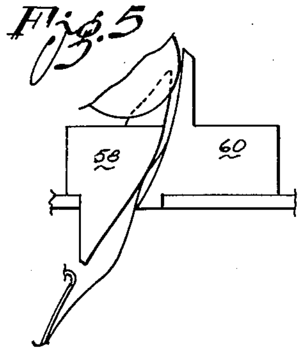
FIG. 5 is a view similar to FIG. 4 showing the buckling of the tape at a more advanced stage.

FIG. 4 shows how the buckling of the tape in the entrance zone starts with slight lateral bowing of the traveling tape away from the portion **50*a*** of the curved boundary wall. FIG. 5 shows the lateral bowing of the tape at a more advanced stage. The lateral bowing is directed against adjacent stored portions of the tape and is resisted by the adjacent stored portions. This resistance to the bowing of the tape is necessary to cause a new loop to form in the desired manner.

Figure 6:
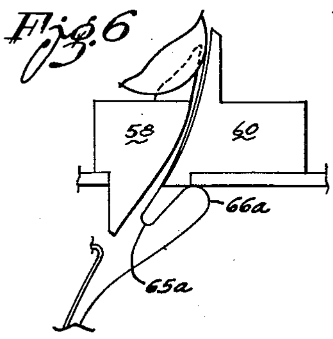
FIG. 6 shows how the continued buckling of the tape results in the formation of a new advancing loop.

FIG. 6 shows how the resistance to further lateral bowing of the tape results in the formation of a new advancing loop **65*a*. At the same time, what may be termed a return loop or bend 66*a*** is formed adjacent the entrance to the storage space.

Figure 7:
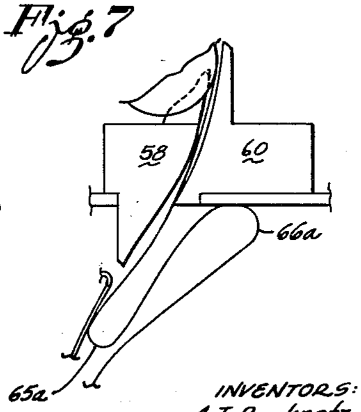
FIG. 7 is a view similar to FIG. 6 showing a later stage in the advance of the newly formed loop.

FIG. 7 shows how the edgewise propulsion of the newly entering tape causes the new loop **65*a* to advance along the metal band 50 with the newly entering tape sliding along the metal band in face to face contact with the wall. FIG. 7 and FIG. 1 as well, show how the newly advancing loop 65*a* noses or wedges between the boundary wall and the previously stored tape to force the stored tape away from the metal band 50** towards the central region of the storage area.

When the advancing tape loop **65*a* eventually reaches the obstacle 64**, the consequent abrupt rise in the resistance to the sliding movement of the tape along the boundary wall brings the tape to a stop. When the advance of the tape is stopped in this manner, low magnitude sliding friction is immediately replaced by high magnitude static friction and at the same time a shock wave travels back through the arrested tape to the entrance zone to help trigger the bowing action required for the formation of a new loop.

The bottom plate 18 of the tape magazine 12 is suitably inclined downward towards the side wall 16 to cause the tape in the storage area to tend to gravitate towards the portion **50*b* of the barrier wall. For this purpose, the base plate 10 on which the film magazine is mounted may be inclined to the desired degree. The purpose of the inclination is to tend to cause the runs of tape formed by the successive loops to tend to stack together. This tendency of the stored runs of tape to pack together compactly in face to face abutment may be noted, for example, at 68 where most of the runs of the tape in the storage area form a compact bundle. The packing tendency is effective over a relatively wide range, there being stacks of fewer runs at 70 and 72. A stack may branch off the main stack as may be seen at 74**.

The storage density, i.e., the length of stored tape per square foot of storage area is increased over prior art practices by forming the stored tape into relatively long runs to reduce the number of space-occupying tape loops and is further increased by causing the long runs of tape to stack in the described manner. Since each successive advancing loop must push past the stacks 70 and 68 with a wedging action, it is apparent that the resistance to the sliding movement of the tape of each advancing loop along the portions 50*a* and 50*b* of the barrier wall includes the resistance involved in pushing the stacked runs of tape to one side. If the storage area were not inclined, it would be possible to form the tape into relatively long runs but the runs would not be compactly stacked to provide the desired high storage density. On the other hand, if the storage area were sloped excessively, the runs of tape would stack together effectively but the runs would be short because the weight of the stacked tape would resist the advance of the successive tape loops to such a high degree as to cause the newly entering tape to buckle before an advancing loop reaches the obstacle 64. Thus, if the storage area were inclined too much, the runs of tape would be too short to achieve the desired storage density. It has been found that the inclination of the storage area should not be more than 20° from horizontal. Excellent results have been obtained with the slope approximating 4°.

It should be noted that the stacks 70 and 68 form a movable barrier for each successive advancing loop of the tape at the entrance of the magazine. Such an advancing loop has a static side which engages the movable barrier and a dynamic side which moves along the barrier wall 50. There is, therefore, no rubbing motion between the advancing loop portion of the tape and the portions forming the movable barrier.

Then as each successive moving loop of the tape is arrested by the obstacle 64 it starts to collapse due to the force exerted by the movable barrier referred to above. This collapse does not occur before such arrest so that there is no rubbing between the individual portions of the loop. Even after the loop is arrested the collapse is slow due to the entrapped air between the two sections of the loop.

The action described in the preceding two paragraphs constitutes an important feature of the invention. The particular configuration of the magazine, as described, enables the tape to be fed into the magazine quickly and without any rubbing action between adjacent sections of the tape.

It has also been found that with the storage area sloped, the desired tendency of the runs of tape to stack together may be increased by vibrating the storage surface. The optimum degree of slope, then, depends in part on the amplitude and frequency with which the bottom plate 18 of the tape magazine is vibrated. It has been found unnecessary to provide any special means to vibrate the storage surface in this particular embodiment of the invention since the normal operation of the tape driving mechanism usually creates adequate vibration for a slope of 4°.

FIG. 1 shows the general pattern that is sought for the stored tape. The pattern is characterized by dense packing in the regions of the portions 50*a* and 50*b* of the boundary wall and is further characterized by two clusters of loops. The right side of the storage area is occupied by a cluster of previously advanced loops 65 and the left side of the storage space is occupied by previously formed return loops 66.

A newly formed run of tape between an advanced loop 65 and a return loop 66 conforms closely to the configuration of the curved boundary wall 50 in the region of the portions 50*a* and 50*b* but with passing time each run progresses towards the central region of the storage area where it is bent back on itself to a U-shaped configuration. Thus, each run eventually assumes a final configuration similar to that of the central run 75 of FIG. 1 and then the run passes out of the magazine through the exit opening 22. It is apparent in FIG. 1 that each newly advanced loop 65 progresses across the storage area to reach eventually the general position of the advanced loop 65*b* at one end of the run 75 and each return loop 66 eventually reaches the general position of the return loop 66*b* at the other end of the U-shaped run 75.

In the migration of the successive advanced loops 65 from their initial position to their ultimate positions, the loops naturally seek paths of least resistance and in doing so, the loops may digress backwards to split the stacked runs of tape. Thus, the previously mentioned branch stack 74 is deflected from the stack 72 by the temporary intrusion of the advanced loop 65.

The gain in storage density provided by controlled buckling in the manner described together with provision for gravitational stacking may be appreciated by comparison. If the traveling tape is stored in the magazine in a random manner with a relatively large number of loops or bends per one hundred feet of tape and with the runs of tape extending in random directions, approximately one hundred feet of tape may be stored in a tape magazine of the usual size. In contrast, it has been found that the new pattern of the stored tape will permit as much as three hundred feet of traveling tape to be stored in the same area.

Figure 3:
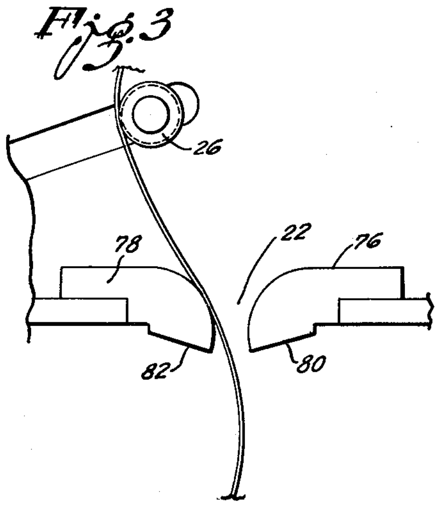
FIG. 3 is an enlargement of another fragment of FIG. 1 showing the tape passing outward through the exit opening of the tape magazine.

There may be some tendency for a previously advanced tape loop 65 to be dragged into the exit opening 22 by the tape traveling through the exit opening since the stored loop 65 presses against the outgoing tape. To avoid this possibility of a loop 65 being funneled into the exit opening 22, the configuration of the structure in the tape magazine in the region of the exit opening 22 may be such as to tend to divert tape loops laterally away from the exit opening. As best shown in FIG. 3, the exit opening 22 may be formed by a pair of spaced blocks 76 and 78 on opposite sides of the opening. The block 76 provides a surface 80 inside the film magazine that is inclined to deflect a tape loop on the right side of the outgoing tape rightward away from the exit opening 22 and in like manner the block 78 is provided with an inclined surface 82 for leftward deflection of loops on the left side of the outgoing tape.

There are a number of ways in which the described method of handling the tape in the magazine 12 minimizes the wear on the coated side of the tape. It can be seen in FIG. 1 that since the coated side of the tape faces the transducers 34 and 40, it is the smooth uncoated side of the ingoing tape that slides along the boundary wall 50. It is also the smooth uncoated side of the stored tape that is rubbed by the smooth uncoated side of the tape of each successive advancing loop. It is also the smooth uncoated outer side of each advancing loop that encounters the obstacle 64. The coated side of the ingoing tape is merely laid against the coated side of the adjacent stored run of tape with no significant friction effect. All of the return loops 66 have their coated sides outward but these loops shift to their ultimate position with no significant rubbing action among the loops. Sliding action of tape against tape occurs in the cluster of advanced loops and especially rubbing action between the outgoing tape at the exit 22 and the adjacent advanced loops 65, but in all of these loops, the uncoated side of the tape is on the outside of the loop to take the friction.

It is also to be noted that while the coated side of the tape faces inward in the final U-shaped configuration of the run 75 in FIG. 1, the tendency of the two legs of the U-shaped configuration to spread apart keeps the coated side of the outgoing tape from rubbing against the coated side of the adjacent stored tape. Thus the two legs of the U-shaped run 75 tend to spread apart and this tendency may be noted in a similar run 75*a* that is in the course of being dissipated at the exit opening 22. It is to be further noted that there is a tendency for a gap to be maintained between the wing of the configuration formed by the cluster of return loops 66 and the wing of the configuration formed by the cluster of advancing loops 65. This tendency for the two wings of the pattern to spread apart provides adequate room for lateral shift of the advanced loops **65*b* in FIG. 1. Thus, the tendency of the legs of the U-shaped run 65*a* to spread apart forces the outer coated side of the loop 65*b*** away from the coated side of the outgoing tape.

Our description in specific detail of the selected practice of the invention will suggest various changes, substitutions and other departures from our disclosure within the spirit and scope of the appended claims.

We claim:

1. In apparatus wherein the major portion of a travelling endless tape is stored in serpentine folds in a storage space with the tape travelling from the storage space to a transducing station and back to the storage space, the combination of: means including first, second, third and fourth side walls and a bottom plate which cooperate to form a shallow box constituting a storage space for the edgewise support of the endless tape; said first side wall having spaced openings therein respectively forming an entrance zone and an exit zone for said storage space; a curved metallic band positioned in said storage space adjacent said side walls, the portion of said band adjacent said second and third side walls having an inwardly extending gradual arcuate curvature to militate against any tendency for the tape to buckle away from said portion of the band, and said metallic band defining a sharp acute-angled bend adjacent the junction of said fourth wall with said third wall to form an obstacle directly across the path of advance of successive folds of the tape to form an arrested fold of the tape adjacent said arcuate portion of said curved band, said sharp acute-angled bend in said band causing the tape to buckle at said entrance zone to permit a new fold of the tape to advance along said arcuate portion of said curved band; tape-driving means positioned adjacent said first wall on the side thereof remote from said storage space to withdraw the tape from said storage space at said exit zone and to propel the tape longitudinally back into said storage space at said entrance zone; and guide means at said entrance zone for directing the in-going tape along a path into face-to-face relationship with said arcuate portion of said curved band to cause the in-going tape to slide along said arcuate portion with minimum resistance to buckling.

2. The combination defined in claim 1 and in which said bottom plate slopes from said first wall towards said third wall to cause the tape in said storage space to gravitate toward said third wall and thereby form a pattern of stored tape characterized by multiple runs of the tape packed together in face-to-face relationship in the region of said third wall, with a first cluster of the folds of the tape extending from said third wall over said storage space towards said entrance zone and with a second cluster of folds of the tape extending from said third wall over said storage space towards said exit zone.

3. The combination set forth in claim 2 and in which said bottom plate slopes from said first wall towards said third wall at an angle of the order of 4° to the horizontal when the apparatus is supported in a horizontal plane.

References Cited in the file of this patent

UNITED STATES PATENTS

| | | |
|---|---|---|
| 667,436 | Granichstaedten | Feb. 5, 1901 |
| 743,419 | Armat | Nov. 10, 1903 |
| 1,297,049 | Webster | Mar. 11, 1919 |
| 2,331,947 | Wack | Oct. 19, 1943 |
| 2,569,364 | Zenner | Sept. 25, 1951 |
| 2,679,394 | Lear | May 25, 1954 |